Dec. 29, 1970          J. W. ODIORNE           3,550,258
              METHOD OF MANUFACTURING A ROLLER
                   Original Filed June 23, 1967

INVENTOR.
John W. Odiorne
BY
Brown and Mikulka
and
Robert S. Corb
ATTORNEYS

1

3,550,258
METHOD OF MANUFACTURING A ROLLER
John W. Odiorne, Lynn, Mass., assignor to Polaroid Corporation, Cambridge, Mass., a corporation of Delaware
Original application June 23, 1967, Ser. No. 648,500, now Patent No. 3,447,221, dated June 3, 1969. Divided and this application Aug. 27, 1968, Ser. No. 755,696
Int. Cl. B23p *17/00, 25/00*
U.S. Cl. 29—527.2          5 Claims

ABSTRACT OF THE DISCLOSURE

A method of manufacturing a roller, having a high coefficient of friction and a precisely controlled diameter by covering a knurled metal core with an elastomer and grinding the periphery to uncover the peaks of the knurling and recess them beneath the surface of the elastomer.

---

This application is a division of copending application Ser. No. 648,500, filed June 23, 1967, and now Pat. No. 3,447,221, June 3, 1969.

The present invention is concerned with the manufacture of a roll adapted to be juxtaposed with a similar roll and rotated to advance sheet material at a precisely controlled speed between the rolls. Rolls of the type embodying the present invention find particular utility in photographic apparatus such as a camera of the type disclosed, for example, in the copending U.S. patent application of Edwin H. Land Ser. No. 549,961, filed May 13, 1966, now Pat. No. 3,369,823, in which a photosensitive sheet is advanced by the rolls during exposure while other components of the camera are being moved in synchronism with the photosensitive sheet to achieve a proper exposure. It is important in such apparatus that the photosensitive sheet be moved at a precisely predetermined speed, however, such preciseness can be achieved only with rigid, non-deformable rolls having diameters which do not vary, but which usually have a relatively low coefficient of friction. It is also important that there be no slippage between the driven roll (or rolls) and the sheet material being advanced thereby, and this is best assured by employing a roll having at least a surface composed of a material having a high coefficient of friction such as elastomer which is also pliant and therefore will have a variable diameter.

The roll produced by the method of the invention combines the advantages of both the constant diameter of a rigid structure and the high friction coefficient of the deformable structure in a novel and improved construction incorporating the desirable features and eliminating the undesirable features of both.

Other objects of the invention will in part be obvious and will in part appear hereinafter.

The invention accordingly comprises the process involving the several steps and the relation and order of one or more of such steps with respect to each of the others which are exemplified in the following detailed disclosure, and the scope of the application of which will be indicated in the claims.

For a fuller understanding of the nature and objects of the invention, reference should be had to the following detailed description taken in connection with the accompanying drawing wherein.

Figure 1:
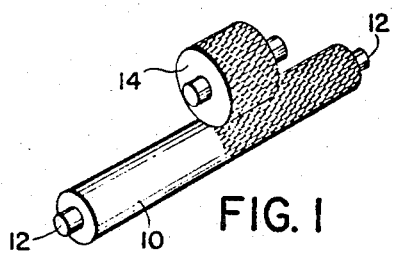
FIG. 1 is a perspective view illustrating a step in the method of producing a roller.

Reference is now made to FIG. 1 of the drawings wherein there is illustrated one of the initial steps in the manufacture of the roller of the invention. A cylindrical roller core 10 having stub shafts 12 on its ends is formed of a rigid material, preferably a metal such as steel. The cylindrical peripheral surface of roller core 10 is then knurled in a conventional manner by rotating it against a knurling tool 14. The knurling tool is preferably adapted to form a relatively deep, diamond knurl, that is, a knurl composed of pyramidal peaks and valleys; and the original diameter of roll core 10 and the knurling tool are designed to provide a knurled surface having an outer dimension exceeding the diameter of the finished roll, preferably such that the finished roll will have an outer surface located approximately one-third of the way inwardly from the tips of the peaks.

Figure 2:
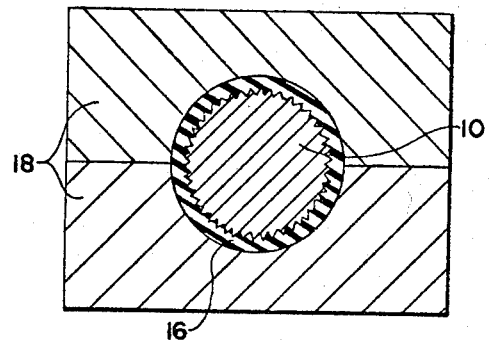
FIG. 2 is a sectional view illustrating another step in the formation of the roller.
Figure 3:
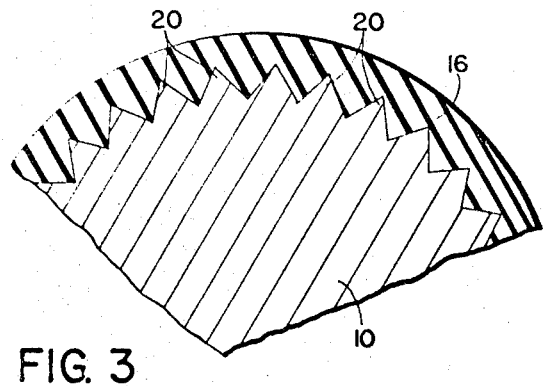
FIG. 3 is a fragmentary, sectional view of a roller during one phase of its manufacture.

The knurled roll core is then covered with a layer of a material having a high coefficient of friction and a thickness exceeding the height of the peaks so that the high coefficient of friction material completely covers the peaks of the knurling and fills the valleys between the peaks. Preferred materials for this purpose include the elastomers such as rubber, neoprene, urethane and the like. A covering 16 of an elastomer can be formed around knurled roll core 10 as shown in FIG. 2 by a conventional molding process in which knurled roll core 10 is mounted in a cylindrical cavity between a pair of dies and the elastomer is injected into the cavity around the knurled roll and subjected to heat and pressure to cure the elastomer. The roll, upon removal from the dies, will take the form shown in FIG. 3 in which cover 16 is firmly anchored to roll core 10 by the knurling and the peaks 20 of the knurling are completely covered.

Figure 4:
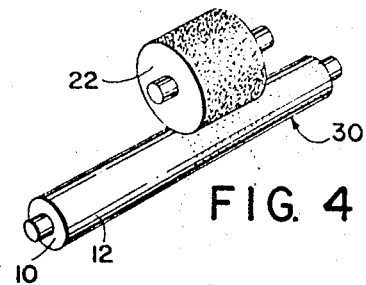
FIG. 4 is a perspective view illustrating another step in the manufacture of the roller.

The next step in the process of manufacture of a roll involves removal of a part of elastomer cover 16 to uncover peaks 20 and removal of the tips of the peaks to reduce roll core 10 to final desired outer diameter which is to remain fixed when the roll is in use. A portion of elastomer cover 16 is also removed to form a cylindrical outer surface having a diameter exceeding the diameter of the cylindrical surface defined by in the peaks of the knurling. This final structure shown in FIG. 5 is produced by grinding the elastomer covered roll as shown in FIG. 4 by rotating the roll and a grinding wheel 22 about parallel axes.

It has been discovered that grinding is effective to uncover and remove the tips of peaks 20 so that the ends of the peaks lie in a cylindrical surface while simultaneously forming a substantially cylindrical, concentric surface on elastomer cover 16 having an outer diameter slightly greater than the diameter of the cylinder in which the end surfaces of the peaks are located. The difference in diameter between the peaks and the elastomer cover may be of the order of .001 to .003 inch and is just sufficient to insure good frictional engagement between the roll and an element in contact with the roll while not affecting the diameter of the roll which is a function of the diameter of the cylinder in which the end surfaces of the peaks are located.

Figure 5:
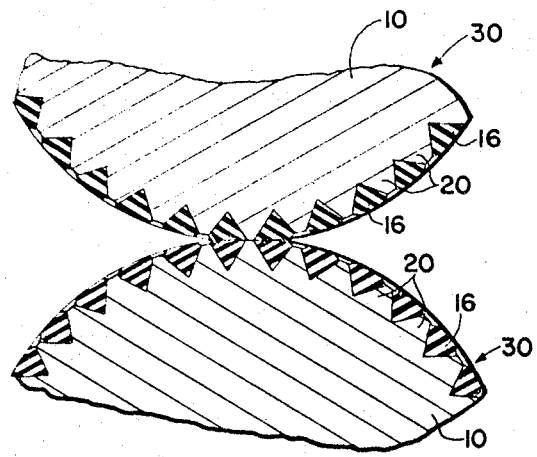
FIG. 5 is a fragmentary, sectional view illustrating a pair of completed rollers arranged in juxtaposition to show their functional advantage.
Figure 6:
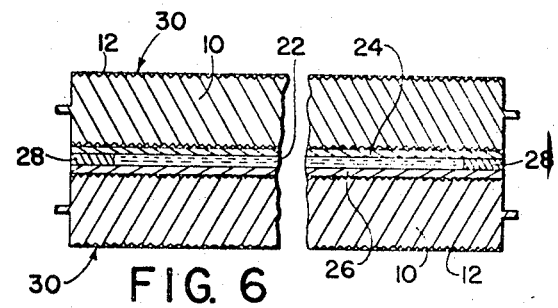
FIG. 6 is a sectional view illustrating the use of the rollers in photography.

FIG. 5 shows two finished rollers, designated 30, mounted in juxtaposition with their axes parallel and biased toward one another. It will be noted that the end surfaces of peaks 20 of two juxtaposed rollers engage one another and determine the spacing between the axes of the rollers which remains invariant despite changes in the pressure exerted on the rollers.

A pair of rollers 30 constructed in accordance with the invention may be employed in photographic apparatus such as a camera described in the aforementioned Land application, for example, to distribute a liquid processing composition in a layer 22 between a pair of photographic sheets 24 and 26, spaced from one another at their margins by spacers 28. The speed of movement of the sheets between rolls 30 is determined by the angular velocity and diameter of the driven roll, and the thickness of the layer of liquid distributed between the sheets is determined by the spacing between the axes of the rolls and their diameters. Speed of movement of the sheets and the thickness of the layer of liquid are controlled very precisely since both the diameters of the rolls and the spacing between the rolls are invariant because both are determined by the rigid knurled core 10, and there is no slippage between the sheets and rolls since frictional engagement between the rolls and the sheet material is assured by elastomer covering 16. On the other hand, because the elastomer cover has a diameter exceeding only slightly the diameter of the core and the end surfaces of the peaks are uncovered, the elastomer cover does not have any effect on the diameters of the rolls.

Since certain changes may be made in the above process without departing from the scope of the invention herein involved, it is intended that all matter contained in the above description or shown in the accompanying drawings shall be interpreted as illustrative and not in a limiting sense.

What is claimed is:

1. A method of producing a roller comprising:
   forming a roller of a substantially hard, rigid material;
   knurling the peripheral surface of said roller to form peaks and valleys;
   applying a layer of an elastomer to the knurled surface completely filling said valleys and covering said peaks; and
   removing the tips of said peaks to form end surfaces thereon and simultaneously removing a portion of said elastomer layer so as to simultaneously form a substantially cylindrical, concentric surface on said elastomer layer having an outside diameter slightly greater than the diameter of the cylinder in which said end surfaces of the peaks are located.

2. The method described in claim 1, wherein said portion of said elastomer layer and said tips of said peaks are removed by grinding said elastomer-covered roller.

3. The method described in claim 2 wherein said elastomer-covered roller is ground to a cylindrical shape.

4. A method of producing a roller comprising:
   forming a generally cylindrical roller of a substantially hard, rigid material;
   knurling the peripheral surface of said roller to form peaks and valleys;
   applying a layer of an elastomer to the knurled surface completely filling said valleys and covering said peaks;
   removing a portion of said elastomer layer to uncover said peaks and generate a cylindrical outer surface about the axis of said cylindrical roller; and
   removing the tips of said peaks to form end surfaces thereon located at a second cylindrical surface concentric with said outer cylindrical surface and having a smaller diameter.

5. The method described in claim 4 wherein said portion of said elastomer layer and said tips of said peaks are removed by grinding.

References Cited
UNITED STATES PATENTS

| | | | |
|---|---|---|---|
| 1,560,524 | 11/1925 | Avery | 74—230.7 |
| 2,638,050 | 5/1953 | King | 29—148.4X |
| 2,793,571 | 5/1957 | Way et al. | 29—130 |
| 2,865,144 | 12/1958 | Seward | 51—141 |
| 3,187,409 | 6/1965 | Glass | 29—121X |

FOREIGN PATENTS 779,674    7/1957    Great Britain.

JOHN F. CAMPBELL, Primary Examiner

D. C. REILEY, Assistant Examiner

U.S. Cl. X.R.

29—148.4, 530